US005666808A

United States Patent [19]

Yamashita et al.

[11] Patent Number: 5,666,808

[45] **Date of Patent: *Sep. 16, 1997**

[54] OPERATING VALVE ASSEMBLY WITH PRESSURE COMPENSATION VALVE

[75] Inventors: Koji Yamashita; Teruo Akiyama; Kouji Saito; Shinichi Shinozaki, all of Kanagawa, Japan

[73] Assignee: Kabushiki Kaisha Komatsu Seisakusho, Tokyo, Japan

[ * ] Notice: The term of this patent shall not extend beyond the expiration date of Pat. No. 5,535,663.

[21] Appl. No.: 524,439

[22] Filed: Sep. 6, 1995

Related U.S. Application Data

[62] Division of Ser. No. 318,631, filed as PCT/JP93/00459, Apr. 9, 1993, Pat. No. 5,535,663.

[30] Foreign Application Priority Data

Apr. 10, 1992 [JP] Japan .................................... 4-030355

[51] Int. Cl.$^6$ .................................................... F16D 31/02

[52] U.S. Cl. .................................................... 60/426; 60/452

[58] Field of Search ............................. 60/427, 426, 452; 91/447, 512, 517, 518

[56] References Cited

U.S. PATENT DOCUMENTS

| | | | |
|---|---|---|---|
| 3,156,098 | 11/1964 | Rou | 60/427 |
| 3,602,243 | 8/1971 | Holt et al. | 91/518 |
| 4,425,759 | 1/1984 | Krusche . | |
| 4,617,798 | 10/1986 | Krusche . | |
| 4,787,294 | 11/1988 | Bowden | 91/447 |
| 4,986,071 | 1/1991 | Voss et al. | 60/427 |
| 5,271,227 | 12/1993 | Akiyama et al. | 91/449 |
| 5,273,069 | 12/1993 | Akiyama et al. | 91/447 |
| 5,535,663 | 7/1996 | Yamashita et al. | 91/517 |

FOREIGN PATENT DOCUMENTS

| | | |
|---|---|---|
| 37 01 211 | 8/1987 | Germany . |
| 38 02 672 | 8/1989 | Germany . |
| 40 40 523 | 4/1991 | Germany . |
| 40 05 967 | 8/1991 | Germany . |
| 2-49405 | 10/1990 | Japan . |
| 4-19411 | 1/1992 | Japan . |

*Primary Examiner*—F. Daniel Lopez
*Attorney, Agent, or Firm*—Wenderoth, Lind & Ponack

[57] ABSTRACT

An operating valve assembly incorporates a pressure compensation valve and is capable of contributing down-sizing of a hydraulic circuit. The valve assembly includes an operating valve, compensation valves and a load pressure detecting portion. A valve body of the operating valve defines a spool bore extending laterally through the valve body at a vertically intermediate portion of the valve body, a load pressure detecting port at a laterally intermediate portion of the spool bore, and a respective pump port, actuator port and tank port at each side of the load pressure detecting port. The operating valve also includes a spool within the spool bore. The pressure compensation valves are arranged at left and right sides of an upper portion of the valve body and the load pressure detecting portion, for supplying load pressure to the load pressure detecting port, is formed in the spool.

10 Claims, 7 Drawing Sheets

FIG. 1 - PRIOR ART

OPERATING VALVE ASSEMBLY WITH PRESSURE COMPENSATION VALVE

This is a divisional application of Ser. No. 08/318,631, filed as PCT/JP93/00459, Apr. 9, 1993, now U.S. Pat. No. 5,535,663.

BACKGROUND OF THE INVENTION

The present invention relates to an operating valve assembly with a pressure compensation valve.

When a pressurized fluid discharged from a single hydraulic pump is distributed to a plurality of actuators, it is typical to provide a plurality of operating valves in a discharge line of the hydraulic pump and to supply a pressurized fluid to respective actuators by switching operating valves. In such a hydraulic circuit, if the pressurized fluid is to be supplied to a plurality of hydraulic actuators simultaneously, the pressurized fluid may be supplied only to the actuator having a smaller load and cannot be supplied to the actuator having the greater load. As a solution for such a problem, there have been proposed hydraulic circuits, such as that disclosed in Japanese Examined Patent Publication (Kokoku) No. Heisei 2-49405.

FIG. 1 shows one example of the conventional hydraulic circuit. The shown hydraulic circuit includes a plurality of operating valves 2 in a discharge line 1*a* of a hydraulic pump. A pressure compensation valve 5 is provided in each circuit 4 connecting each operating valve to a hydraulic actuator 3. The highest pressure among the pressures in the respective circuits, i.e. among the load pressures, is detected by a load pressure detecting path 7 incorporating check valves 6. The detected highest load pressure acts on each of the pressure compensation valves 5 for setting a set pressure at a pressure level corresponding to the detecting load pressure. In conjunction therewith, an outlet side pressure of each operating valve is controlled to be lower than the set pressure so that when the operating valves 2 are operating simultaneously, the pressurized fluid may be distributed to respective actuators at a distribution ratio proportional to the open areas of the operating valves.

The hydraulic circuit of the type set forth above is complicated since it requires the operating valve 2, the pressure compensation valve 5, and the load pressure detecting path 7 in the circuit 4. Furthermore, such a hydraulic circuit is bulky and thus requires a wide space for installation. In order to solve this problem, it may be considered to provide the operating valve 2, the pressure compensation valve 5 and the load pressure detecting path 7 within a single block. However, if these components are simply aggregated within the single block, the block inherently becomes large and cannot be made compact.

SUMMARY OF THE INVENTION

Therefore, it is an object of the present invention to provide an operating valve assembly with a built-in pressure compensation valve which renders a hydraulic circuit compact.

In order to accomplish the above-mentioned and other objects, according to the first aspect of the present invention, an operating valve assembly comprises:

- an operation valve being constructed by forming a spool bore extending laterally through the vertically intermediate portion of a valve body, forming a load pressure detecting port at a laterally intermediate portion of the spool, forming pump ports, actuator ports and tank ports at both sides of the load pressure detecting port, and inserting a spool within the spool bore;
- pressure compensation valves being arranged at left and right sides of an upper portion of the valve body; and
- a load pressure detecting portion, for detecting a load pressure and supplying the detected load pressure to the load pressure detecting port, formed in the spool.

It should be noted that auxiliary valves may be arranged at left and right sides of the lower portion of the valve body. Also, it is desirable that the pressure compensation valves each compose a valve establishing and blocking communication between an outlet port and a control passage connecting the actuator port to a hydraulic load and means for biasing the valve in a valve closing direction, and the biasing means for biasing the valve in the valve closing direction includes an actuation chamber generating a biasing force by receiving the load pressure. In this case, it is preferred that the operating valve assembly further comprises means for introducing a holding pressure of the hydraulic load into the actuation chamber at a neutral position of the spool.

According to the second aspect of the invention, an operating valve assembly comprises:

- a valve body;
- a spool bore formed through the central portion of the valve body, and to which a first hydraulic pressure passage introducing a supply pressure from a hydraulic pressure source, a second hydraulic pressure passage supplying a control pressure to a hydraulic load, a third hydraulic pressure passage by which the first and second hydraulic pressure passages can be placed in communication, and a fourth hydraulic pressure passage connected to a low pressure side of the hydraulic pressure source for recirculating a working fluid to the hydraulic pressure source, are opened;
- a spool slidably disposed within the spool bore and establishing and blocking communication between the first and third hydraulic pressure passages and between the second and fourth hydraulic pressure passages;
- a pressure compensation valve provided in parallel to the axis of the spool bore at a position offset from the axis of the spool bore in a direction perpendicular to the axis, and establishing and blocking communication between the second and third hydraulic pressure passages for controlling a control pressure to be supplied to the hydraulic load depending upon the load pressure;
- a load pressure detecting portion formed in the spool and communicating with the second hydraulic pressure passage for generating a detected load pressure corresponding to the load pressure of the hydraulic load; and
- a load pressure supply portion for supplying the detected load pressure to the pressure compensation valve.

In the construction set forth above, it is preferable that the operating valve assembly further supply a holding pressure for holding the hydraulic load to an operating state to the pressure compensation valve as the detected load pressure. Also, the operating valve assembly may further comprise means for control the discharge amount of a pressurized fluid in the hydraulic pressure source and the load pressure supply portion may be connected to the discharge amount controlling means for controlling the amount of the pressurized fluid discharged from the hydraulic pressure source depending upon the detected load pressure.

It is possible for the load pressure supply portion to include means for preventing an abrupt variation of the discharge amount of the hydraulic pressure source upon an abrupt variation of the load pressure of the hydraulic load by discharging a part of the detected load pressure.

It is desirable that the load pressure supply portion detects a highest pressure among load pressures detected by respective load pressure detecting means of a plurality of operating valve assemblies as the detected load pressure and supplies the highest load pressure to respective pressure compensating valves of a plurality of operating valve assemblies and to the discharge amount controlling means.

BRIEF DESCRIPTION OF THE DRAWINGS

The present invention will be understood more fully from the detailed description given herebelow and from the accompanying drawings of the preferred embodiment of the invention, which, however, should not be taken to be limitative of the present invention, but are for explanation and understanding only.

In the drawings.

BEST MODE FOR CARRYING OUT THE INVENTION

The preferred embodiment of an operating valve assembly according to the present invention will be discussed hereinafter with reference to FIGS. 2 to 7.

Figure 1:
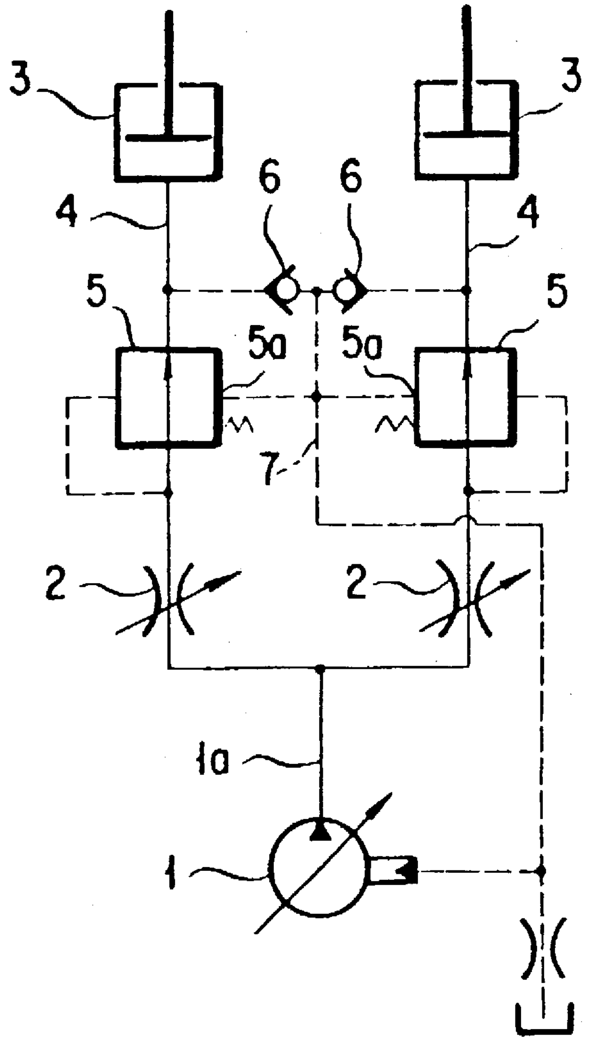
FIG. 1 is a hydraulic circuit diagram of the conventional hydraulic circuit.
Figure 2:
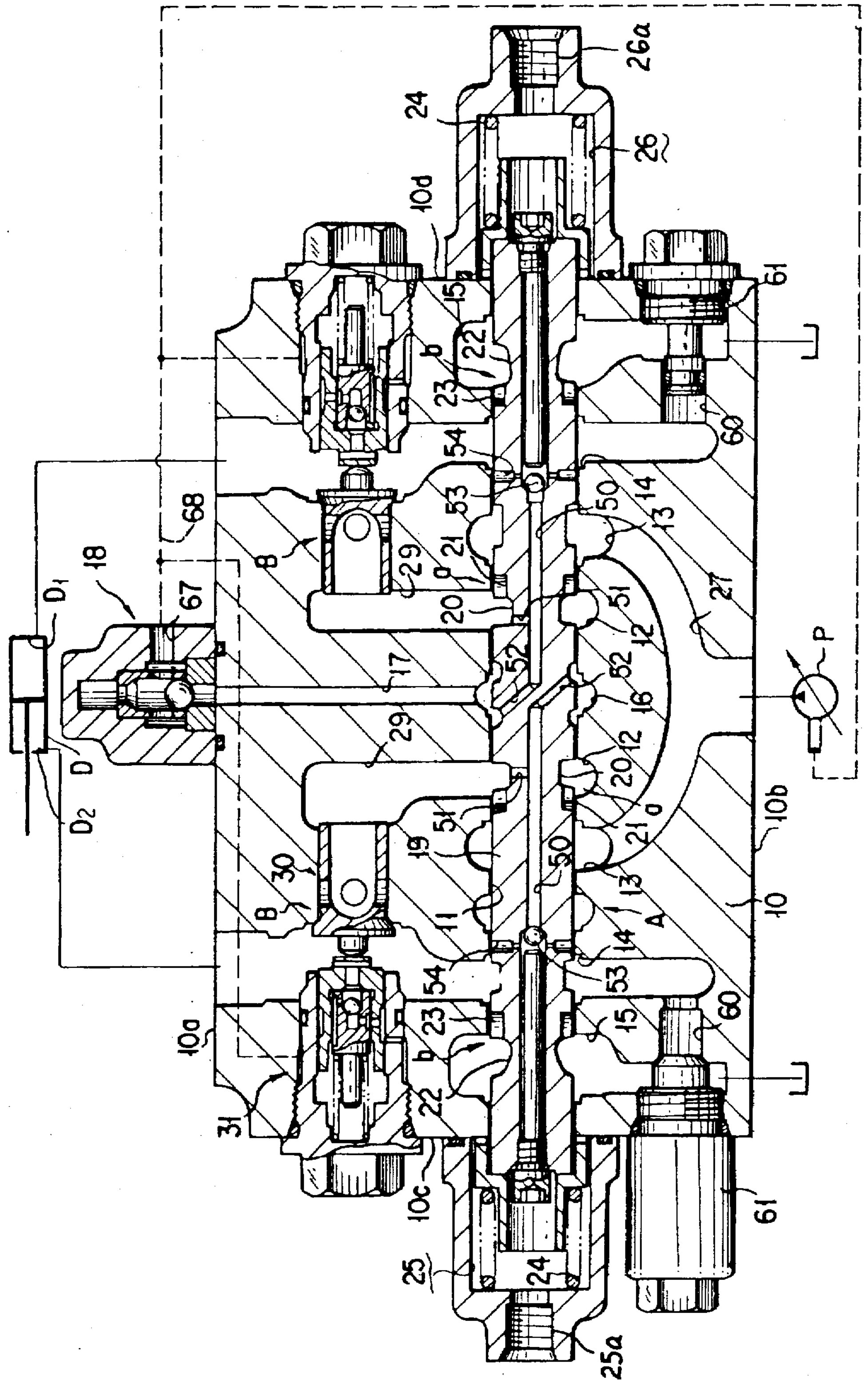
FIG. 2 is a sectional view of the preferred embodiment of an operating valve assembly according to the present invention.
Figure 3:
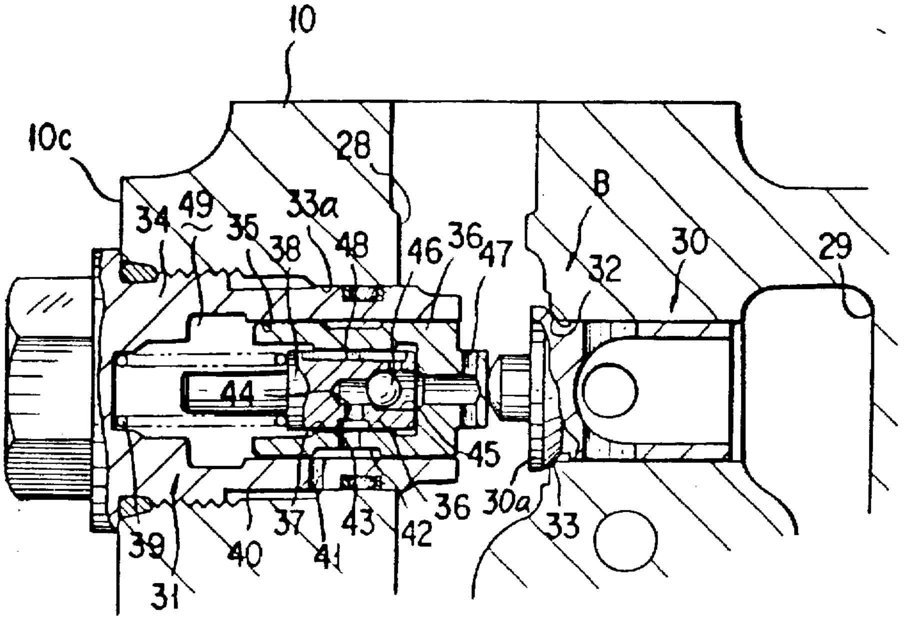
FIG. 3 is an enlarged sectional view of a pressure compensation valve provided in the preferred embodiment of the operating valve assembly of FIG. 2.

As shown in FIG. 2, a valve body 10 has a substantially rectangular solid configuration with an upper surface 10*a*, a lower surface 10*b*, a left side surface 10*c*, a right side surface 10*d* and front and back surfaces. At the intermediate portion of the valve body 10 in the vertical direction, a spool bore 11 opening to the left and right side surfaces 10*c* and 10*d* at both ends extends.

At both sides of the central portion of the spool bore 11 of the valve body 10 between both ends in the lateral direction, a pair of outlet ports 12, 12 pump ports 13, 13 actuator ports 14, 14 and tank ports 15, 15 are formed. Also, at the central portion of the spool bore 11 in the lateral direction, a load pressure detection port 16 is formed. The load pressure detection port 16 is communicates with a load pressure detection path 17 opening to the upper surface 10*a* of the valve body 10. On the upper surface 10*a* of the valve body 10, a shuttle valve 18 is formed at a position corresponding to the opening position of the load pressure detection path 17. In the spool bore 11, a spool 19 is inserted in slidable fashion. At the positions of the spool 19 opposing the outlet ports 12, 12 and pump ports 13, 13, a pair of first annular grooves 20, 20 extending circumferentially and first axial grooves 21, 21 communicating with the annular grooves and extending in a predetermined length in the axial direction are formed. The first annular grooves and first axial grooves form a meter-in throttle portion a for establishing and blocking communication between the pump ports 13, 13 and the outlet ports 12, 12. At the positions of the spool 19 corresponding to the actuator ports 14, 14 and the tank ports 15, 15, a pair of second annular grooves 22, 22 extending circumferentially and second axial grooves 23, 23 extending a predetermined length in the axial direction are formed. The second annular grooves 22, 22 and the second axial grooves 23, 23 form a meter-out throttle portion b for establishing and blocking communication between the actuator ports 14, 14 and the tank ports 15, 15. At both ends of the spool bore 11 in the axial direction, left and right pressure receiving chambers 25 and 26 are defined in opposition to the ends of the spool 19. Within the pressure receiving chambers 25 and 26, springs 24, 24 seating on the ends of the spool 19 at one end and seating on the bottom walls of the pressure receiving chambers at the other end, are disposed. The spool 19 is normally biased to the neutral position shown in FIG. 2 by means of the springs 24, 24. As shown, at the neutral position of the spool 19, the first annular grooves 20, 20 and first axial grooves 21, 21 block communication between the output ports 12, 12 and the pump ports 13, 13, and the second annular grooves 22, 22 and the second axial grooves 23, 23 block communication between the actuator ports 14, 14 and the tank ports 15, 15. To pressure receiving chambers 25 and 26, pilot ports 25*a* and 26*a* are opened. Pilot ports 25*a* and 26*a* are connected to an appropriate pilot pressure supply source and introduce the pilot pressure supplied from the pilot pressure source to the pressure receiving chambers 25 and 26 for displacing the spool to a desired position.

When the pilot pressure is supplied to the left side pressure receiving chamber 25, the spool 19 is displaced the right compressing the spring 24 at the right side. The spool 19 displaces the right to reach the first displaced position to establish communication between the right side pump port 13 and the right side outlet port 12. At the same time, the spool 19 establishes communication between the left side actuator port 14 and the left side tank port 15. On the other hand, when the pilot pressure is supplied to the right side pressure receiving chamber 26, the spool 19 displaces toward the left compressing the spring 24 at the left side. Then, the spool 19 displaces toward the left to reach the second displaced position to establish communication between the left side pump port 13 and the left side outlet port 12, and, at the same time, to establish communication between the right side actuator port 14 and the right side tank port 15.

In the shown embodiment of the operating valve assembly A constructed as set forth above, the hydraulic pressure is selectively supplied to both working chambers $D_1$ and $D_2$ of the actuator constituted of a hydraulic cylinder, in the shown case.

The left and right pump ports 13, 13 are connected to a pump P via an inlet passages 27 branching from single inlet opening formed on the lower surface 10*b* of the valve body 10. On the other hand, the left and right actuator ports 14, 14 are connected to respective working chambers $D_1$ and $D_2$ of the actuator D via control passages 28, 28 opening on the upper surface 10*a* of the valve body 10. The outlet ports 12, 12 communicates with the control passages via hydraulic pressure supply passages 29, 29 opening to the intermediate portions of the control passages 28, 28. In the opening portions of the hydraulic pressure supply passages 29, 29, pressure compensation valves B are provided.

Each pressure compensation valve B comprises a valve portion 30 and a valve biasing portion 31 biasing the valve portion in a valve closing direction. The valve portion 30 comprises a cone type valve 30*a* having a surface 33 abutting a valve seat 32 of the valve body 10. On the back side of the valve 30*a*, the pressure at the outlet port 12 acts in the valve opening direction.

The valve biasing portion 31 includes a sleeve 34 fixed on a mounting bore 33*a* opening to the control passage 28. A blind bore 35 is formed in the sleeve 34. A piston 36 is slidably disposed within the blind bore 35. Also, a blind bore 37 is formed in the piston 36. The blind bore 37 slidably receives a slider 38 in a slidable fashion. Between the slider 38 and the bottom of the blind bore 35, a spring 39 is disposed to normally bias the slider 38 in the direction away from the bottom of the blind bore 35. Between the outer periphery of the sleeve 34 and the surface of the valve body 10 defining the mounting bore 33*a*, an annular chamber 40 is defined. The annular chamber 40 opens to a stepped hole 45 formed in the slider 38 via an orifice 41, an annular groove 42, an radial holes 43 and 44. Within the stepped hole 45, a ball 46 is disposed. On the ball 46, a control pressure of the actuator port 14 introduced through the control passage 28 and the radial passage 47 and the pressure introduced through the annular chamber 40 act at both sides so a higher one of the pressures may be introduced into an actuation chamber 49 housing the spring 39 via a slit 48 of the slider 38. Namely, by the stepped hole 45 of the slider 38 and the ball 46, the shuttle valve is formed.

Accordingly, on the piston 36, a pressure of the annular chamber 40 introduced via the shuttle valve or the control pressure of the actuator port 14, and the spring force of the spring 39 is acted for biasing the valve 30*a* in the valve closing direction.

In the axial center of the spool 19, a pair of left and right load pressure detecting holes 50, 50 are formed. The load pressure detecting holes 50, 50 communicate with the first annular grooves 20, 20 via first ports 51, 51 and communicate with the load pressure detection port 16 via second ports 52, 52. Furthermore, to the load pressure detecting holes 50, 50, third ports 54, 54 opened. The third ports 54, 54 communicate with the actuator ports 14, 14 at the first and second displaced positions of the spool 19 to introduce the control pressure at the actuator ports into the load pressure detecting holes 50, 50. The load pressure detecting holes 50, 50 are stepped so as to greater diameters in the vicinity of the opening position of the third ports 54, 54, and balls 53, 53 are provided at the steps. The balls 53, 53 are displaced in the valve opening direction by the pressure of the outlet ports 12, 12 introduced from the first ports 51, 51 at the first and second displaced positions of the spool 19 to lower the pressure in the load detection holes 50, 50 until the pressure balances with the control pressures at the actuator ports 14, 14. On the other hand, the pressure of the load pressure detecting holes 50, 50 is supplied to the shuttle valve 18 via the load pressure detection port 16 as the detected load pressure.

The actuator ports 14, 14 and the tank ports 15, 15 communicate with communication holes 60. To the communication holes 60, auxiliary valves 61, such as safety valves or suction valves and so forth are provided. By these auxiliary valves, communication and blocking between the actuator ports 14, 14 and tank ports 15, 15 is controlled.

Figure 4:
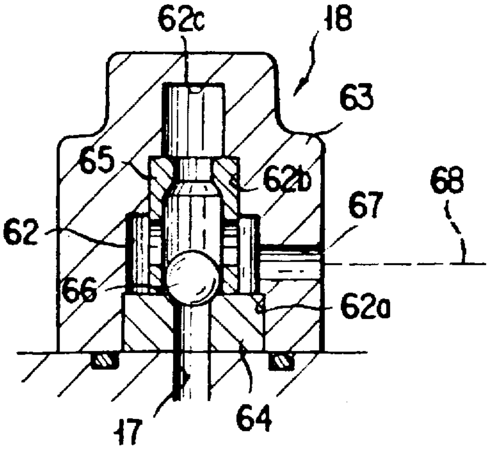
FIG. 4 is an enlarged sectional view of a shuttle valve provided in the preferred embodiment of the operating valve assembly of FIG. 2.
Figure 5:
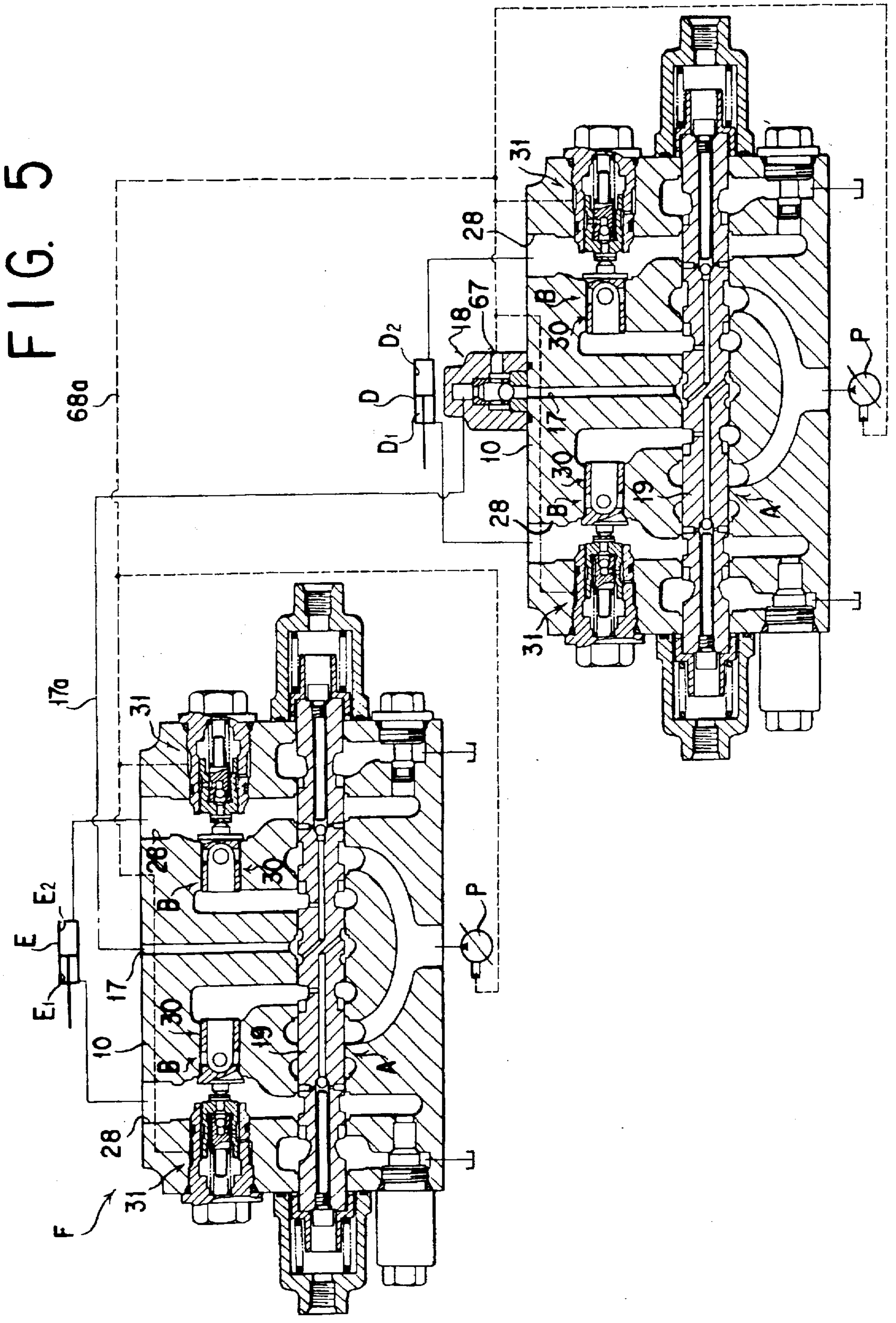
FIG. 5 is an illustration showing one example of the hydraulic circuit, in which a plurality of operating valve assemblies are provided for controlling a plurality of actuators with fluid from a common hydraulic pump.

The shuttle valve 18 comprises a valve body 63 formed with a stepped hole 62 communicating with the load pressure detecting passage 17 at the lower opening, a valve seat 64 fitted in the lower larger diameter portion 62*a* of the stepped hole, a ball housing 65 fitted in a middle diameter portion 62*b* of the stepped hole, and a ball 66 disposed within the ball housing, as shown in FIG. 4. To the upper small diameter portion 62*c* of the ball housing, a detected load pressure in the load pressure detecting passage 17 of the other operating valve assembly F connected to the supply pump P provided for controlling another actuator E, is introduced through a fluid passage 17*a*. Accordingly, on the ball 66, a detected load pressure introduced from the load pressure detecting passage 17 and a detected load pressure introduced via a fluid passage 17*a* are exerted. The ball 66 is displaced according a pressure difference between both of the detected load pressures to introduce the higher one of the detected load pressures to the annular chamber 40 via the outlet port 67 and the load pressure supply passage 68. Furthermore, the load pressure supply passage 68 is connected to a discharge amount adjusting mechanism for controlling the output of the pump P depending upon the load pressure. On the other hand, the load pressure supply passage 68 supplies load pressure to the other operating valve assembly controlling actuator E via a fluid passage 68*a*.

It should be noted that the construction of the operating valve assembly controlling the actuator E is identical to that of the operating valve assembly controlling the actuator D except for the absence of the shuttle valve 18. Therefore, the corresponding elements are represented by the same reference numerals and a discussion of the construction and operation is omitted.

The construction and operation of the discharge amount adjusting mechanism of the pump P has been disclosed in commonly owned "Pressurized Fluid Supply System" filed as International Application under the Patent Cooperation Treaty on Apr. 8, 1993 claiming priority based on Japanese Patent Applications Nos. Heisei 4-161925 and Heisei 4-161926 and Japanese Utility Model Application No. Heisei 4-29640. The disclosure of the above-identified International Application is herein incorporated by reference.

Next, the operation of the shown embodiment of the operating valve assembly of the present invention constructed as set forth above will be discussed.

From the neutral position of FIG. 2, when the pilot pressure is supplied to the left side pressure receiving chamber 25, the spool 19 shifts toward the right to reach the first displaced position as set forth above. By this, the supply pressure of the hydraulic pump P is supplied to the right side outlet port 12 via the right side pump port 13 and the right side meter-in throttle portion a. With this supply pressure, the valve portion 30 of the right side pressure compensation valve B is biased in the valve opening direction to open. Then, the control pressure is supplied to the working chamber $D_1$ of the actuator D via the control passage 28. At this time, the recirculated hydraulic pressure discharged from the working chamber $D_2$ is drained to the reservoir tank of the pump P from the tank port 15 via the left side control passage 28, the left side actuator port 14 and the left side meter-out throttle portion b.

The hydraulic pressure in the right side meter-in throttle portion a is introduced into the right side load pressure detecting hole 50 via the first annular groove 20 and the first port 51. At this time, on the ball 53 inserted within the load pressure detecting hole 50, this pressure acts to displace the ball toward the right to establish communication between the load pressure detecting hole 50 and the control passage 28 via the third port 54. Therefore, a part of the hydraulic pressure of the load pressure detecting hole 50 is introduced into the control passage 28. Then, the pressure in the load pressure detecting hole 50 is gradually lowered until it becomes equal to the control pressure. The load pressure thus generated in the load pressure detecting hole 50 is supplied to the shuttle valve 18 as the detected load pressure via the load pressure detecting port 16, the second port 52 and the load pressure detecting passage 17. The higher one of the load pressures of two operating valve assemblies selected by the shuttle valve 18 is introduced into the load pressure supply passage 68 via the outlet port 67. This load pressure is introduced into the first annular chamber 40 of the valve biasing portion 31 and then introduced into the stepped bore 45 formed in the slider 38 via the orifice 41, the annular groove 42 and the radial holes 43 and 44. When the load pressure is higher than the control pressure of the control passage 28, the ball 46 of the shuttle valve is displaced. Then, the load pressure is introduced into the actuation chamber 49. By this, the load pressure and the spring force of the spring 39 act on the piston 36 to bias the valve 30*a* of the valve portion 30 in the valve closing direction. With this construction, while the spool 19 is in the neutral position, a holding pressure of the actuator D may used in the pressure compensation valve B for pressure compensation. Also, when the spool 19 is shifted to the first or second displaced position, the pressure compensation valve B is instantly set at the higher pressure side whereby the response characteristics of the actuator D can be improved.

Namely, when the ball 46 is not provided and the holding pressure is not supplied to the actuation chamber 49, a delay is caused in elevating the hydraulic pressure in the actuation chamber in response to displacement of the spool 19 to the first or second displaced position result, the response characteristics of the actuator decrease.

The operation of the pressure compensation valve B is also disclosed in detail in the above-identified International Application filed under the Patent Cooperation Treaty, on Apr. 8, 1993.

Figure 6:
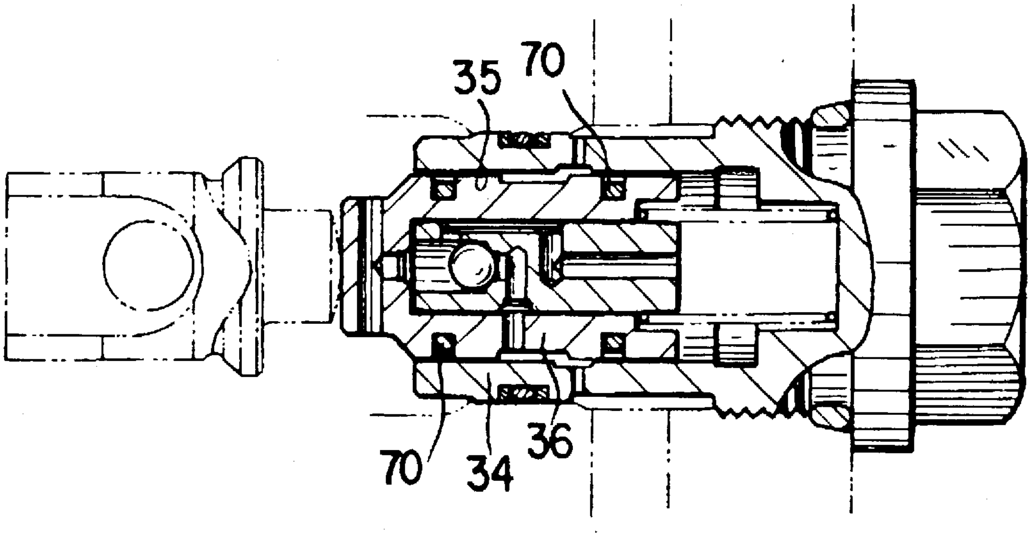
FIG. 6 is a sectional view of a modified version of the pressure compensation valve.

FIG. 6 shows a modification of the pressure compensation valve B. On the outer peripheral surface of the piston 36, a sealing member 70 is provided for establishing a seal with the sleeve 34.

When the sealing member 70 is not provided, leakage of the pressurized fluid through a small gap between the blind bore 35 of the sleeve 34 and the outer peripheral surface of the piston 36 occurs if the holding pressure of the hydraulic actuator D is high. This becomes internal leakage by returning into the load pressure supply passage 68 to cause a natural drop in the pressure of the actuator D. However, in the construction of the shown embodiment, the holding pressure of the hydraulic actuator D will never leak to the annular chamber 40 through the gap between the sleeve 34 and the outer peripheral surface of the piston 36, and thus the natural in the pressure of the hydraulic actuator D can be successfully prevented.

Figure 7:
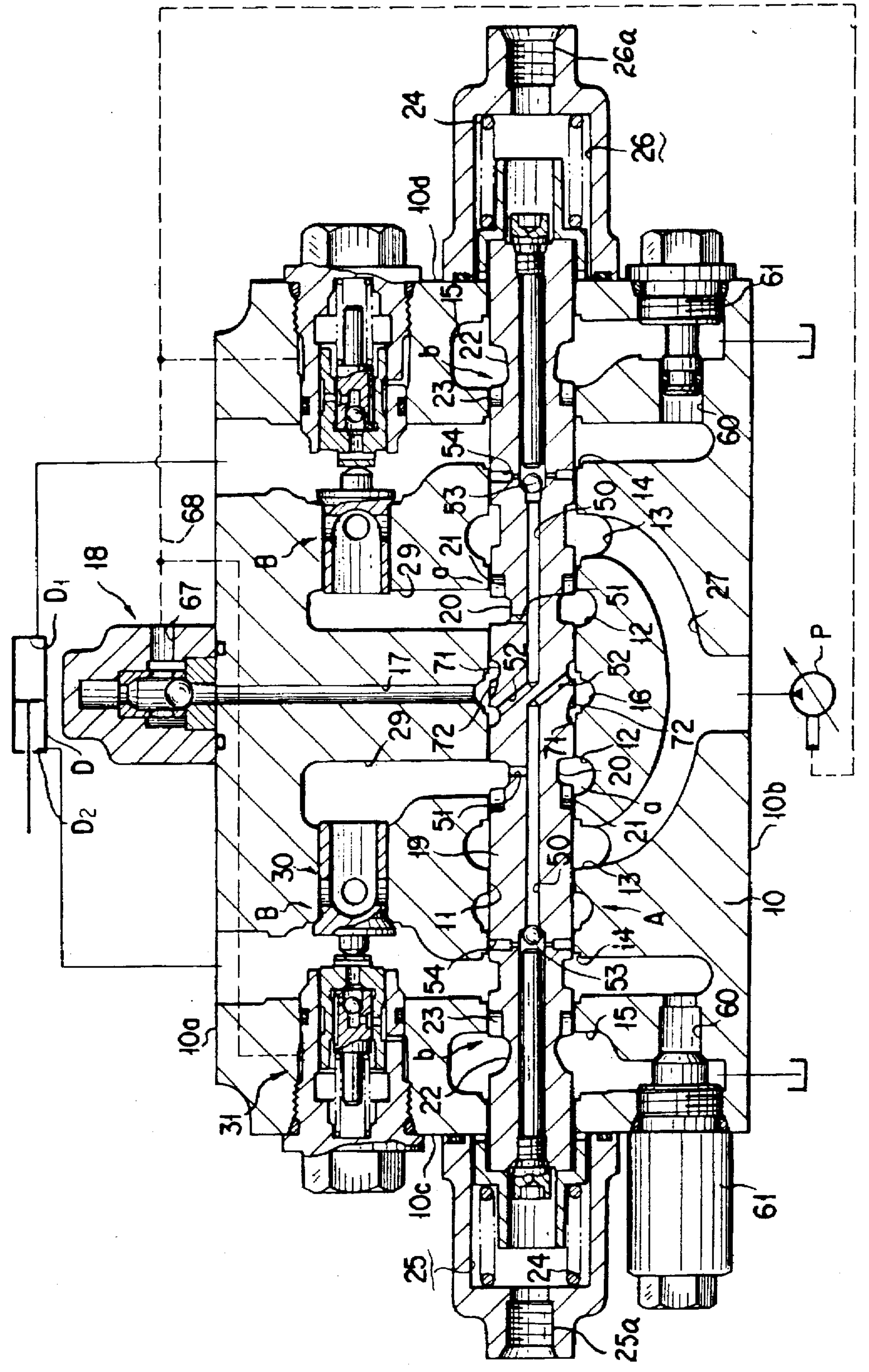
FIG. 7 is a sectional view of a modified version of a load pressure detecting portion.

FIG. 7 shows a modification of the load pressure detecting portion C. In the shown embodiment, the second ports 52, 52 formed in the spool 19 extend obliquely, and the opposite ends of the load pressure detecting holes 50, 50 are opened to annular recesses 71, 71 at overlapping positions. The spool 19 is formed with left and right cut-out grooves 72, 72 communicating with the annular recesses 71, 71.

By this, as shown in FIG. 7, when the spool 19 is shifted to the first displaced position, a part of the pressurized fluid flowing into the load pressure detecting port 16 from the right side load pressure detecting hole 50 flows into the left side load pressure detecting hole 50 via the cut-out groove 72 and the annular recess 71 and then flows into the left side outlet port 12 to bias the valve portion 30 of the pressure compensation valve B in the valve opening direction, whereby fluid flows to the left side tank port 15 through the left side meter-out throttle portion b.

Accordingly, a pair of load pressure flows to the tank lower the hydraulic pressure to be introduced into the load pressure supply passage 68. When the discharge amount of the pump is controlled on the basis of this load pressure, even if the variation of this load pressure is abrupt, the discharge amount of the hydraulic pump is varied moderately. Accordingly, when a load having a large inertia force, such as the upper rotary body of a power shovel or so forth, is to be driven by the actuator, hunting due to an abrupt increase of the discharge pressure at the initial stage of driving is successfully prevented.

Figure 8:
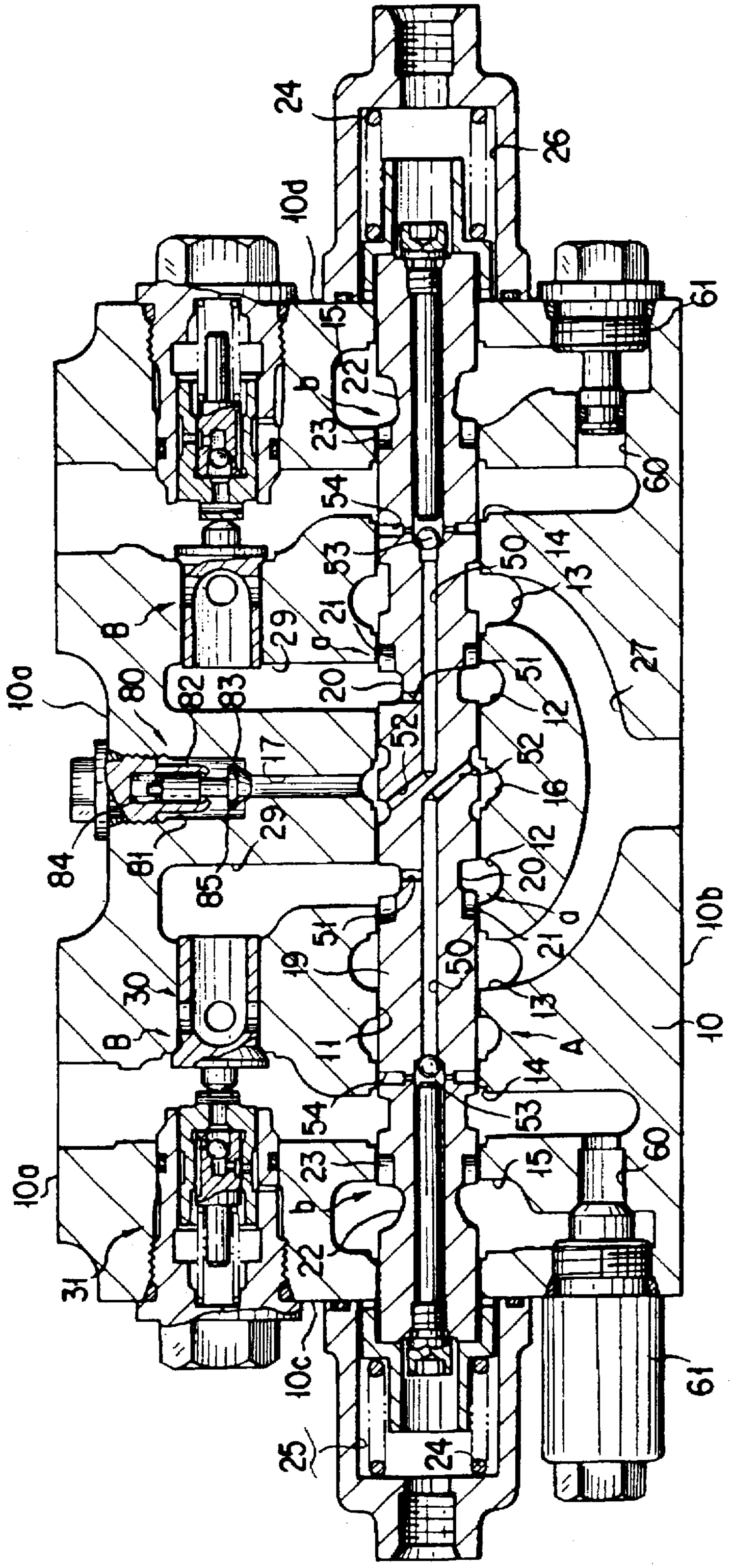
FIG. 8 is a sectional view of a load pressure detecting portion in which a check valve is employed.

FIG. 8 shows an embodiment in which a check valve is employed in place of the shuttle valve. A check valve 80 is constructed by forming a mounting hole 81 in the upper surface 10*a* of the valve body 10, threadingly mounting a sleeve 82 in the mounting hole 82, providing a poppet 83 within the sleeve 82, and seating the poppet 83 onto a valve seat 86 by biasing the poppet 83 with a spring 84.

As set forth above, according to the present invention, since the operating valve assembly A is constructed by forming the spool bore 11 accommodating therein a spool at the intermediate portion in the vertical position of the valve body 10, the pressure compensation valves B are formed at left and right portions of the upper portion, the spool 19 is formed with the load pressure detecting portion C, and the load pressure detecting port is formed at the intermediate portion in the lateral direction of the spool, the overall construction can be made compact.

Furthermore, at left and right sides of the load pressure detecting port formed at the intermediate portion in the lateral direction of the spool bore 11, the pump ports 13, the actuator ports 14 and tank ports 15 are arranged, and the load pressure detecting portion C is formed in the spool 19, the left and right control pressures output from the left and right actuator ports 14, 14 can be smoothly introduced into the load pressure detecting port 16 via the spool 19, and the load pressure can be supplied to the left and right pressure compensation valves for setting thereof. Therefore, introduction of the load pressure and supplying of the load pressure can be done smoothly.

It should be noted that it is possible to construct respective components of the operating valve assembly in the construction as set forth above as subunits independent of the valve body 10 and assemble them to form the operating valve assembly. Such construction has been disclosed in commonly owned U.S. Patent Application, for "Hydraulic Valve Assembly" filed on Apr. 8, 1993 claiming priority on the basis of Japanese Patent Application No. Heisei 4-341813, filed on Dec. 22, 1992. The disclosure of the above-identified commonly owned U.S. Patent Application is herein incorporated by reference.

Also, the operating valve assembly according to the present invention is applicable in a form not employing the shuttle valve such as that illustrated in FIG. 8 to a hydraulic circuit disclosed in the above-identified International Application, filed on Apr. 8, 1993.

Although the invention has been illustrated and described with respect to preferred embodiments, thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments and equivalents thereof falling with the scope of the appended claims.

We claim:

1. An operating valve assembly comprising:

a valve body;

a spool bore formed through a central portion of said valve body, to which a first hydraulic pressure passage introducing a supply pressure from a hydraulic pressure source, a second hydraulic pressure passage supplying a control pressure to a hydraulic load, a third hydraulic pressure passage selectively communicating said first and second hydraulic pressure passages, and a fourth hydraulic pressure passage connected to a low pressure side of said hydraulic pressure source for recirculating a working fluid to said hydraulic pressure source are opened;

a spool slidably disposed within said spool bore for movement between a neutral position and at least one displaced position displaced axially from said neutral position, wherein said spool operates to establish communication between said first and third hydraulic pressure passages and between second and fourth hydraulic pressure passages when in said at least one displaced position, and wherein said spool operates to block communication between said first and third hydraulic pressure passages and between said second and fourth hydraulic pressure passages when in said neutral position;

a pressure compensation valve provided in parallel to a central axis of said spool bore at a position offset from the axis of said spool bore in a direction perpendicular to said axis, and establishing and blocking communication between said second and third hydraulic pressure passages for controlling the control pressure to be supplied to said hydraulic load depending upon a load pressure;

load pressure detecting means formed in said spool and communicated with said second hydraulic pressure passage for generating a detected load pressure corresponding to the load pressure of said hydraulic load; and load pressure supply means for supplying detected load pressure to said pressure compensating means via said spool bore when said spool is in said neutral position, said load pressure supply means detecting highest pressure among detected load pressures detected by respective load pressure detecting means of a plurality of operating valve assemblies as the detected load pressure and supplying the highest load pressure to a respective pressure compensating valve of the plurality of operating valve assemblies.

2. An operating valve assembly as set forth in claim 1, wherein said load pressure supply means is operable to supply detected load pressure to said pressure compensating means via said spool bore both when said spool is in said neutral position and when said spool is in said at least one displaced position.

3. An operating valve assembly as set forth in claim 1, wherein said load pressure supply means is operable to supply detected load pressure to said pressure compensating means via said spool bore in all axial positions of said spool in said spool bore.

4. An operating valve assembly comprising:

a valve body;

a spool bore formed through a central portion of said valve body, to which a first hydraulic pressure passage introducing a supply pressure from a hydraulic pressure source, a second hydraulic pressure passage supplying a control pressure to a hydraulic load, a third hydraulic pressure passage selectively communicating said first and second hydraulic pressure passages, and a fourth hydraulic pressure passage connected to a low pressure side of said hydraulic pressure source for recirculating a working fluid to said hydraulic pressure source are opened;

a spool slidably disposed within said spool bore for movement between a neutral position and at least one displaced position displaced axially from said neutral position, wherein said spool operates to establish communication between said first and third hydraulic pressure passages and between said second and fourth hydraulic pressure passages when in said at least one displaced position, and wherein said spool operates to block communication between said first and third hydraulic pressure passages and between said second and fourth hydraulic pressure passages when in said neutral position;

a pressure compensation valve provided in parallel to a central axis of said spool bore at a position offset from the axis of said spool bore in a direction perpendicular to said axis, and establishing and blocking communication between said second and third hydraulic pressure passages for controlling the control pressure to be supplied to said hydraulic load depending upon a load pressure;

load pressure detecting means formed in said spool and communicated with said second hydraulic pressure passage for generating a detected load pressure corresponding to the load pressure of said hydraulic load;

load pressure supply means for supplying detected load pressure to said pressure compensating means via said spool bore when said spool is in said neutral position;

means for supplying a holding pressure for holding said hydraulic load in operating state to said pressure compensation valve as said detected load pressure.

5. An operating valve assembly as set forth in claim 4, wherein said load pressure supply means is operable to supply detected load pressure to said pressure compensating means via said spool bore both when said spool is in said neutral position and when said spool is in said at least one displaced position.

6. An operating valve assembly as set forth in claim 4, wherein said load pressure supply means is operable to supply detected load pressure to said pressure compensating means via said spool bore in all axial positions of said spool in said spool bore.

7. An operating valve assembly as set forth in claim 4, which further comprises means for controlling discharge amount of a pressurized fluid in said hydraulic pressure source and said load pressure supply means is connected to said discharge amount controlling means for controlling discharge amount of the pressurized fluid of said hydraulic pressure source depending upon the detected load pressure.

8. An operating valve assembly as set forth in claim 7, wherein said load pressure supply means includes means for preventing abrupt variation of the discharge amount of the hydraulic pressure source upon abrupt variation of the load pressure of said hydraulic load by discharging a part of the detected load pressure.

9. An operating valve assembly as set forth in claim 4, wherein said load pressure supply means detects highest pressure among a detected load pressures detected by respective load pressure detecting means of a plurality of operating valve assemblies as the detected load pressure and supplies the highest load pressure to respective pressure compensating valve of a plurality of operating valve assemblies.

10. An operating valve assembly as set forth in claim 5, wherein said load pressure supply means detects the highest load pressure among load pressures detected by respective of the load pressure detecting means of a plurality of operating valves as the detected load pressure, and supplies to said discharge amount controlling means the selected load pressure as said detected load pressure.

* * * * *